United States Patent
Simon et al.

(10) Patent No.: US 12,229,267 B2
(45) Date of Patent: Feb. 18, 2025

(54) MANAGEMENT OF LOCAL SIGNING OF SOFTWARE PACKAGES USING A TRUSTED EXECUTION ENVIRONMENT

(71) Applicant: Red Hat, Inc., Raleigh, NC (US)

(72) Inventors: Axel Simon, Farnborough (GB); Michael Hingston McLaughlin Bursell, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 973 days.

(21) Appl. No.: 17/193,463

(22) Filed: Mar. 5, 2021

(65) Prior Publication Data

US 2022/0284100 A1    Sep. 8, 2022

(51) Int. Cl.
| | |
|---|---|
| *G06F 21/57* | (2013.01) |
| *G06F 8/41* | (2018.01) |
| *G06F 8/61* | (2018.01) |
| *H04L 9/08* | (2006.01) |
| *H04L 9/14* | (2006.01) |

(Continued)

(52) U.S. Cl.
CPC ............ *G06F 21/57* (2013.01); *G06F 8/44* (2013.01); *G06F 8/61* (2013.01); *H04L 9/0819* (2013.01); *H04L 9/14* (2013.01); *H04L 9/3236* (2013.01); *H04L 9/3247* (2013.01); *H04L 63/04* (2013.01); *G06F 2221/033* (2013.01); *G06F 2221/2149* (2013.01)

(58) Field of Classification Search
CPC ...................................................... G06F 21/57
See application file for complete search history.

(56) References Cited

U.S. PATENT DOCUMENTS

| | | | |
|---|---|---|---|
| 9,049,013 B2 * | 6/2015 | Paczkowski | H04W 12/08 |
| 9,626,513 B1 | 4/2017 | Aytek et al. | |
| 9,749,141 B2 * | 8/2017 | Keidar | H04L 9/3263 |

(Continued)

FOREIGN PATENT DOCUMENTS

| | | |
|---|---|---|
| CN | 111740824 A | 10/2020 |
| EP | 3704614 A1 | 9/2020 |

(Continued)

OTHER PUBLICATIONS

Unsung Lee et al., "SofTEE: Software-Based Trusted Execution Environment for User Applications", Department of Computer Science and Engineering, Pohang University of Science and Technology, Pohang, South Korea, https://ieeexplore.ieee.org/document/9131703, Jun. 15, 2020, pp. 121874-121888, vol. 8.

*Primary Examiner* — Simon P Kanaan
(74) *Attorney, Agent, or Firm* — Womble Bond Dickinson (US) LLP

(57) ABSTRACT

Systems and methods providing a processing device to receive, by a software build process executing in a trusted execution environment (TEE) of a first computer system, software source code from a second computer system. The processing device generates a software package by compiling the software source code. The processing device also receives, from the second computer system, a signing key associated with the second computer system. The processing device further signs the software package using the signing key associated with the second computer system. The processing device then deploys the signed software package on the first computer system.

18 Claims, 8 Drawing Sheets

(51) Int. Cl.
*H04L 9/32* (2006.01)
*H04L 9/40* (2022.01)

(56) References Cited

U.S. PATENT DOCUMENTS

| | | |
|---|---|---|
| 9,979,703 B2 | 5/2018 | Warnez et al. |
| 10,216,512 B1* | 2/2019 | Mathew .................... G06F 8/41 |
| 10,701,084 B2 | 6/2020 | Surdu |
| 2016/0188350 A1 | 6/2016 | Shah |
| 2017/0123773 A1* | 5/2017 | Gao ........................ G06F 8/443 |
| 2017/0180391 A1 | 6/2017 | Hinchliffe et al. |
| 2019/0166116 A1 | 5/2019 | Kumar |
| 2019/0220324 A1* | 7/2019 | Carver .................... H04L 67/10 |
| 2020/0177397 A1 | 6/2020 | Harrington |
| 2021/0112038 A1 | 4/2021 | Karame |
| 2021/0192360 A1 | 6/2021 | Bitauld |

FOREIGN PATENT DOCUMENTS

| | | |
|---|---|---|
| WO | 2019206315 A1 | 10/2019 |
| WO | 2020143906 A1 | 7/2020 |

\* cited by examiner

MANAGEMENT OF LOCAL SIGNING OF SOFTWARE PACKAGES USING A TRUSTED EXECUTION ENVIRONMENT

TECHNICAL FIELD

The present disclosure is generally related to computer systems, and more particularly, to management of local signing of software packages using a trusted execution environment.

BACKGROUND

Cloud computing defines a model for enabling ubiquitous, convenient, on-demand network access to a shared pool of configurable computing resources (e.g., networks, servers, storage, applications, and services) that can be rapidly provisioned and released with minimal management effort or service provider interaction. Essential characteristics of the cloud computing model include on demand self-service, broad network access, resource pooling, rapid elasticity and measured service. The cloud computing model comprises several service models, including Software as a Service (SaaS), Platform as a Service (PaaS), and Infrastructure as a Service (IaaS). The cloud computing model may be implemented according to one of several deployment models, including private cloud, community cloud, public cloud and hybrid cloud.

BRIEF DESCRIPTION OF THE DRAWINGS

The present disclosure is illustrated by way of examples, and not by way of limitation, and may be more fully understood with references to the following detailed description when considered in connection with the Figures, in which.

DETAILED DESCRIPTION

Figure 1:
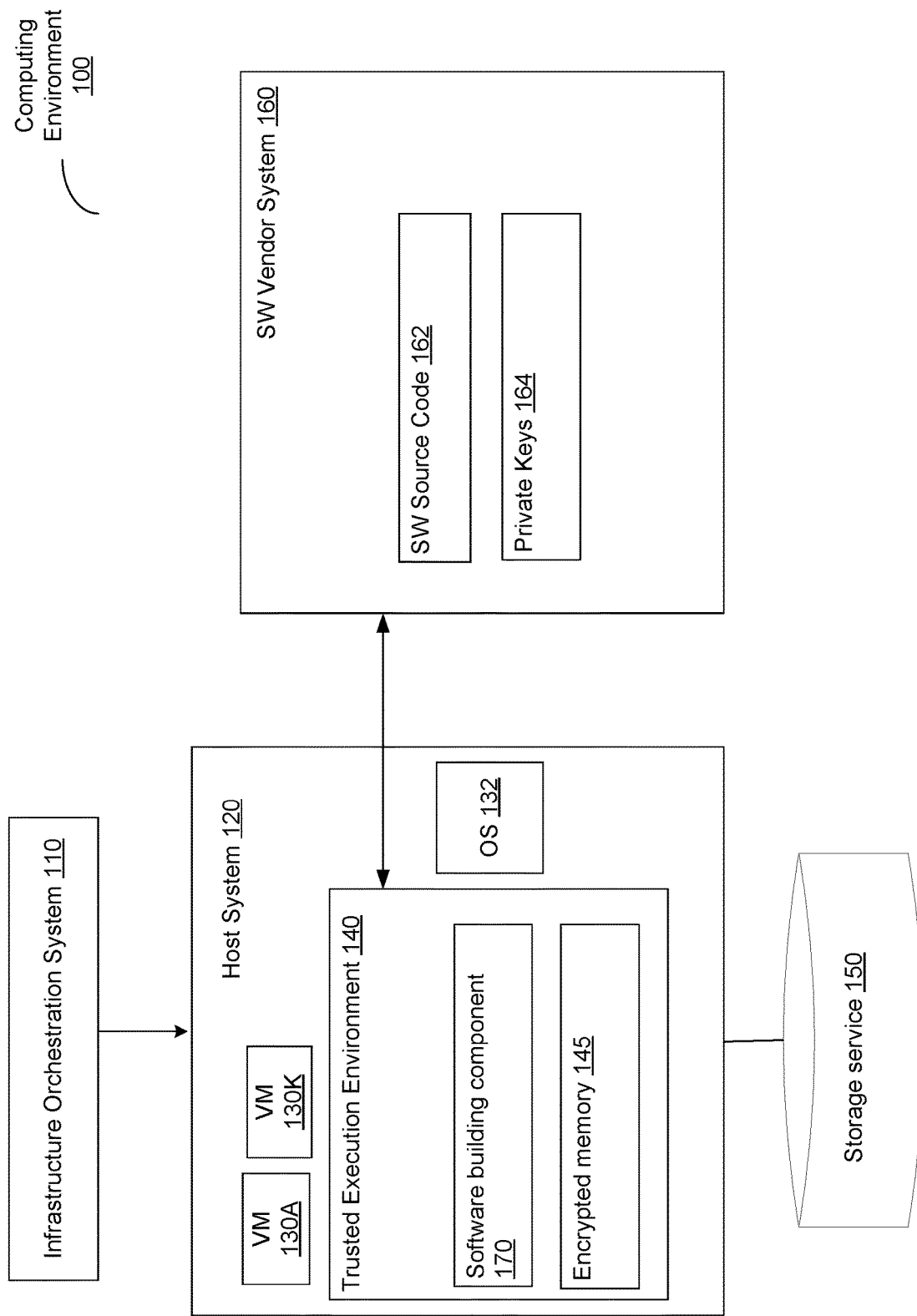
FIG. 1 illustrates an exemplary computing environment in which implementations of the disclosure may operate.

Described herein are methods and systems for management of building and local signing of software packages using a trusted execution environment (TEE). A TEE may be an isolated execution environment, within a host computer system, providing security features such as isolated execution, integrity of applications executing with the TEE, and confidentiality of their data. Various computing environments can be configured to provide on-demand availability of computing resources to consumers without direct management by the consumers. An example of this configuration is cloud computing. Cloud computing defines a computing environment model for enabling ubiquitous, convenient, on-demand network access to a shared pool of configurable computing resources (e.g., networks, servers, storage, applications, and services) that can be rapidly provisioned and released with minimal management effort or service provider interaction. In a cloud computing environment, the computing resources and applications may be hosted by an entity and made available to multiple consumers over the Internet.

Software applications within the cloud environment often need to be installed or upgraded as new versions of each application becomes available, thus providing a method for securely and efficiently building and installing software applications on the cloud environment is highly desirable. Additionally, verifying newly built software packages to ensure that the packages provides the intended functionality and that the packages have not been tampered may be desirable to ensure the integrity of the cloud environment. One approach to validating software packages before installation is to ensure that the packages are cryptographically signed by a trusted authority ensuring the integrity of the signed software package.

Various approaches to signing software packages can rely on software developers signing a software package on their development machines or on a build system having one or more signing keys for signing the packages that are built. The process of building the software source code on the same building environment results in identical build, or minimal variations, for all users of the software regardless of the specific configurations of the various execution environments of each user. Additionally, build systems at the a software vendor contain a set of encryption keys for signing software packages of the vendor that are built on the vendor build system. When the source code is built outside a build system of the software vendor, the result software package may not be signed by the vendor of the software, thus providing no guarantees with regards to the integrity of the built package.

The present disclosure alleviates the above-noted and other deficiencies by enabling software packages and updates of source code from a software vendor to be built within a trusted execution environment (TEE) of a third party-controlled host computer system and then cryptographically signed by the software vendor. A software vendor may be an entity with ownership or licensing rights of certain software source code. The software vendor may have capabilities to compile the software source code to generate a package and then electronically sign the software package or generate a digest of the package. By electronically signing the compiled package, the software vendor indicates to another entity that may desire to execute the package that the package was compiled and built based on an authentic version of the software source code that has been vetted by the software vendor. The software vendor may also electronically sign a hash of a software package that was compiled on a trusted execution environment (TEE) based on source code that is provided by the software vendor, thus providing a proof of the integrity of the software package that was built at the TEE. Further, instead of sending a hash of the software package to the software vendor system for signing, the software vendor, after confirming the authenticity of the TEE, may send to the TEE a private key, which the TEE would be able to use for signing the software package locally. In this case, the private key of the vendor system may be discarded from the TEE after signing the software package.

In one implementation, software source code of a certain software application or update may be downloaded from a software vendor system to a TEE within a host computer system, such that a software package that is tailored to the specific environment of the host computer system can be built within a trusted building environment that is established at the TEE. After downloading the source code for the package, relevant environment parameters and build preferences of the host computer system may be collected in order to be used for customizing the software package for the needs and configurations of the host system. The collected environment parameters and preferences may include the type of operating system of the host system, networking protocol (IPV6, IPV4), whether or not to disable announcements or access to the network, whether or not to include a date of the build, whether or not to add a logo of the company in the package, etc. A software package may then be built based on the source code and the collected environment parameters, such that such that the built package is tailored to the needs and configuration of the host computer system. For example, parts of the source code that do not match the preferences or environment parameters of the host may be excluded from the compiled software package.

In an implementation, a hash of the software package may be generated so that it may be sent to the software vendor to be cryptographically signed. The hash for the compiled software package may be generated using a secure cryptographic hash function, such as hash-based message authentication code (HMAC) functions, SHA 2, SHA 3, etc. The generated hash may then be sent over a secured communication channel from the host system to the software vendor system for signing. The secured communication channel between the host system and the software vendor system may be a VPN channel, an SSH channel, a TLS channel, or any similar secured communication channel. In an implementation, when the secured communication channel is opened, the software vendor sends a remote attestation to the host system indicating a confirmation that the TEE build environment within the host system is legitimate and integrity protected. Remote attestation may refer to a process of one computer proving its identity/integrity to a second computer by sending to the second computer a value representing its identity and configuration, which then validates the received value (e.g., via a common root of trust). Upon receiving the attestation from the software vendor system, the host system may send the hash of the package to the software vendor via the secured communication channel. The software vendor system may then sign the hash using one of a set of private keys of the software vendor system. In an implementation, the software vendor system may have a separate private key per client of the software vendor, such that software packages that are sent to or built by a given client are signed by the same dedicated private key. Alternatively or additionally, the software vendor system may have a separate private key per version of the software source code, such that each new version of the software source code may have a separate private key for signing packages that are built from the specific version of the source code. In certain implementations, signing the hash of the package may include encrypting the hash with the public key. In this case, the signature may be verified by decrypting the encrypted hash by a private key corresponding to the public key.

After signing the hash, the software vendor system may send the signed hash to the host computer system via the secured communication channel. In one implementation, upon receiving the signed hash, a software build process executing at the TEE may deploy the software package, along with the signed hash of the software package to the host computer system for installation on the host computer system. In an implementation, the signed hash may be validated against the software package before installing the software package, to ensure that the package has not been altered after it is built and signed. For example, a new hash of the deployed software package may be generated and compared with the signed hash of the package. If the newly generated hash of the package matches the signed hash, the software package may be deemed valid and may be installed at the host computer system. In certain implementations, if the signed hash was encrypted and signed using a private key, the signed hash may be verified using the signer's public key that corresponds to the private key and decrypted before comparing with the newly generated hash. On the other hand, if the newly generated hash does not match the signed hash, an installation of the software package may be aborted. In certain implementations, after validating the software package, the installed software may be made accessible to other physical or virtual systems within the same trust domain. For example, virtual machines hosted on the host computer system may access and use the installed software package.

In certain implementations, after generating a hash of the built software package, the hash may be signed by the host computer system, using a certificate from a well-known certificate authority or a self-signed certificate for example, before sending the hash to the software vendor system for signing. A self-signed certificate may refer to a security certificate that is not signed by a certificate authority (CA) but is rather created using a security certificate creation tools such as OpenSSL®, Java keytool®, etc. A host computer system may sign the hash using a self-signed certificate to maintain a standard practice of a given client to self-sign software packages that are built at a host system of the client. In this case, after self-signing the generated hash, the self-signed hash may be sent to the software vendor system via the secured communication channel between the host computer system and the software vendor system. The self-signed hash may then be signed by a private key of the software vendor system as a proof of the integrity of the built package and the signed hash may be returned to the host computer system, via the secured communication channel, for deployment on the host computer system. In an implementation, the software vendor system may also send back to the host computer system, a file containing the full chain of trust of the certificate along with the signed hash. The full chain of trust may include the certificate of the CA that issued the certificate of the host system running the TEE, and the certificate of the next level CA, etc., until some common root of trust (such as a well-known CA) is reached.

In an implementation, upon receiving the signed hash from the software vendor system, a software build process executing at the TEE may deploy the software package, along with the signed hash of the software package and the full chain of trust certificate to the host computer system. In an implementation, the signed hash and the full chain of trust certificate may be used to validate the software package before installing the software package on the host system, to ensure the integrity of the signed hash and to confirm that the package has not been altered after it has been built and signed. For example, if a newly generated hash of the package does not match the signed hash, an installation of the software package may be aborted. In certain implementations, after validating and installing the software package, the installed software may be made accessible to other physical or virtual systems within the same trust domain. For example, virtual machines hosted on the host computer system may access and use the installed software package.

In other implementations, the software vendor system may send to the TEE of the host computer a private key, which the TEE would be able to use for singing the built software package. As an example, the software vendor system may send the private key of the client associated with the TEE upon receiving a request from the TEE for the private key from the software vendor system. The private key may then be sent over a secured communication channel (a VPN channel, an SSH channel, a TLS channel) from the software vendor system to the host system for signing the built package. In an implementation, when the secured communication channel is opened, the software vendor perform a remote validation of the host system to ensure that the TEE build environment within the host system is legitimate and integrity protected. Upon validating the TEE build environment, the software vendor system may send the private key, via the secured communication channel, to the TEE at the host system for signing the package. The build process at the host system may then cryptographically sign the software package using the private key of the software vendor system. The build process may then discard the private key received from the software vendor system.

In an implementation, upon signing the software package at the TEE, a software build process executing at the TEE may deploy the signed software package, along with the cryptographic signature of the software package to the host computer system. The cryptographic signature of the software package may be produced by, e.g., encrypting a hash of the software package with the signing key. As an example, the cryptographic signature may be a digital signature of the package that is produced without encrypting the package. In this case, the digital signature can be generated by computing a hash of the contents of the package and then encrypting the hash only with a private key of the signer, such that the encrypted hash represents the digital signature. The unencrypted package can then be sent to the receiver, who computes the hash of the received package and then compares is with the result of decrypting the digital signature with a public key of the signer.

In an implementation, the cryptographic signature may be used to validate the signed software package before installing the software package on the host system, to ensure the integrity of the signed package and to confirm that the package has not been altered after it has been built and signed. For example, the cryptographic signature may be used to verify that the software package is authentic as signed by the software vendor system. In certain implementations, after validating and installing the software package, the installed software may be made accessible to other physical or virtual systems within the same trust domain. For example, virtual machines hosted on the host computer system may access and use the installed software package.

Thus, the systems and methods described herein represent improvements to the functionality of computing environments, by cryptographically signing software package built at a TEEs, using private keys of the vendor system of the software. The ability to have a software source code built at a trusted execution environment of a host system and based on unique settings and preferences of the host system improves the security and efficiency of the cloud environment as it enable smaller packages with optimized execution paths to be deployed at host systems. Additionally, enabling the software vendor to sign a signature of the package built within the TEE of the host system enables an integrity-protected package that can be validated against a signed signature of the package to be deployed at the cloud environment, thus improving the overall integrity of the cloud environment.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

FIG. 1 schematically depicts a high-level component diagram of an example computing environment 100 implemented in accordance with one or more aspects of the present disclosure. Computing environment 100 may refer to cloud computing device (e.g., host machine, virtual machine, container), a distributed computing device (e.g., edge computing node), another computing device, or a combination thereof. In certain implementations, computing device 100 may include one or more computing devices at a single physical location (e.g., data center) or across multiple physical locations (e.g., different data centers). In one example, computing environment 100 may include infrastructure orchestration system 110, one or more host system 120, and storage service 150. In one implementation, a software vendor system 160 may reside within computing environment 100 and may represent a computer system having a software source code that may be downloaded and built remotely at a hot system 120. In other implementations, software vendor system 160 may reside outside the computing environment 100, for example at a second computing environment of a different type than computing environment 100, and may communicate with components of host computer system 120 via communication channels, as explained in more details herein below.

Infrastructure orchestration system 110 may manage the computing environment resources. Infrastructure orchestration system 110 may manage deployment, configuration, and maintenance of the host computers and virtual machines. Infrastructure orchestration system 110 may implement fine-grained life cycle management, user and group role-based access control, integrated subscription management, as well as advanced graphical user interface (GUI), command line interface (CLI), and/or API access. While in the illustrative example of FIG. 1 infrastructure orchestration system 110 is shown as running on a separate physical machine, in various alternative implementations infrastructure orchestration system 110 may be co-located with one of hosts 120.

Computing environment 100 may further include one or more host computer system 120, on which virtual machine instances 130A-130K may run. In some implementations, host 120 may be a physical server (e.g., physical machine) or a virtual server (e.g., implementing a hypervisor and virtual machines, containers). One or more of a host 120 may be absent virtualization technology and one or more of the hosts may provide one or more levels of virtualization. The levels of virtualization may include hardware level virtualization, operating system level virtualization, other virtualization, or a combination thereof. The hardware level virtualization may involve a hypervisor (e.g., virtual machine monitor) that emulates portions of a physical system and manages one or more virtual machines. In contrast, operating system level virtualization may include a single operating system kernel that manages multiple isolated virtual containers. Each virtual container may share the kernel of the underlying operating system without requiring its own kernel.

Trusted execution environment (TEE) 140 may be a set of one or more computing processes, threads, or instruction streams and in one example it may be a set with a single process (e.g., user process) and in another example it may be a set of multiple processes (e.g., all processes of a particular virtual machine). The trusted execution environment may be implemented by one or more processors coupled to a storage device (e.g., memory). The processor may protect data of the set of processes from being accessed by other processes that may be more or less privileged. For example, in a trusted execution environment a central processing processor (CPU) may guard data of a lower privileged process (e.g., user process or virtual machine process) from being accessed by a higher privileged process (e.g., kernel process or hypervisor process). The data being guarded may include executable data (e.g., code), non-executable data (e.g., input data or output data), other data, or a combination thereof. In some examples, trusted execution environment 140 may be provided by special instructions and features of the processor and may be the same or similar to Software Guard eXtensions (SGX)® provided by Intel®, TDX provided by Intel®, Memory Encryption Technology provided by AMD® (e.g., Secure Encrypted Virtualization (SEV)®, Secure Memory Encryption(SME, SME-ES), TrustZone® provided by ARM®, other technology, or a combination thereof. In some or all of these examples, the processor may guard the data by establishing one or more encrypted memory regions 145.

Trusted execution environments 140 may include one or more trusted execution environment instances (e.g., TEE instances). An instance of the trusted execution environment may be established for a particular set of one or more processes and may be associated with a particular memory encrypted region. The instances of a trusted execution environment may be provided by the same hardware (e.g., processor and memory) but each instance may be associated with a different memory encrypted region and a different set of one or more processes (e.g., set including an individual process or set of all processes within a container). Software building component 170 may securely build software source code at TEE 140. As shown in FIG. 1, trusted execution environment 140 may be provided by a respective host system that may guard data associated with a particular instance using one or more encrypted memory region 145.

Software vendor system (TCA) 160 may be a trusted process running within or outside computing environment 100. Vendor system 160 may be responsible for provisioning software source code 162 to software building component 170 for building a software package based on source code 162. Vendor system 160 may also be responsible for signing a software package that is built by software build component 170 using one of private keys 164. In an implementation, vendor system 160 may act as a client with respect to host 120, and may communicate with TEE 140 via XML-RPC or any other suitable protocol. In one implementation, a transport layer security scheme (e.g., secure socket layer (SSL)) may be implemented for secure data and command transmission between vendor system 160, Infrastructure orchestration system 110, TEE 140, and/or software repositories implemented by the shared storage service 150. Vendor system 160 may further perform the functions of singing a software package that is built inside or outside the vendor system 160 by compiling software source code 162 in accordance with one or more aspects of the present disclosure.

Software building component 170 may reside within TEE 140 and may be responsible for building a software package from source code 162. In an implementation, software building component 170 may download source code 162 from software vendor system 160 and may then compile software source code 162 to generate the software package based on environment parameters of host 120. As an example, parts of source code 162 that do not match the preferences or environment parameters of host 120 may be excluded from the compiled software package. After generating the software package, software building component 170 may generate a cryptographic hash of the software package and may send the cryptographic hash to software vendor system 160, so that the hash can be encrypted using one of private keys 164, thus producing a digital signature of the software package. In an implementation, the generated hash may be transmitted form host 120 to vendor system 160 using a secured communication channel, such as a VPN channel, an SSH channel, a TLS channel, or another similar secured communication channel. In an implementation, software vendor system 160 may send a remote attestation to host system 120 confirming that the TEE build environment within host system 120 is legitimate and integrity protected, and software building component 170 may then send the hash to software vendor system 160 for signing. Software vendor system 160 may then sign the hash using one of a set of private keys 164 and may send the signed hash to host 120 via the secured communication channel.

In one implementation, upon receiving the signed hash, software build process 170 may deploy the software package, along with the signed hash of the software package to operating system (OS) 132 of host 120, so that the software package may be validated then installed on memory accessible to OS 132. In an implementation, software building component 170 may be validate the software package using the signed hash before installing the software package, to ensure that it has not been altered after it is built and signed. In certain implementations, after validating and installing the software package, other systems within the same trust environment, such as VM 130A-K, may access and use the installed software package.

In certain implementations, after generating a hash of the built software package, software building component 170 may sign the hash using a private key of a self-signed digital certificate before sending the self-signed hash to software vendor system 160 for signing using one of private keys 164. Software vendor system 160 may then sign the self-signed hash using a private key 164 as a proof from software vendor system 160 of the integrity of the built package. The signed hash may be returned to host system 120, via the secured communication channel, along with a file containing the full chain of trust of the hash. In an implementation, upon receiving the signed hash from software vendor system 160, software build component 170 may deploy the software package, along with the signed hash of the software package and the full chain of trust certificate to operating system 132 for validation and installation. In one implementation, software build component 170 may use the signed hash and the full chain of trust certificate to validate the software package before installing the software package on host system 120.

In other implementations, instead of sending a hash of the software package for signing, the software build component 170 may receive a private key from software vendor system 160 such that the built software package may be signed locally at TEE 140 using the private key of software vendor system 160. The software build component 170 may receive the private key via a secured communication channel (a VPN channel, an SSH channel, a TLS channel) from software vendor system 160 to host system 120 for signing the built package. In an implementation, when software package building 170 opens the secured communication channel, software vendor system 160 perform a remote validation of the host system 120 to ensure that the TEE build environment within host system 120 is legitimate and integrity protected. Upon validating the TEE build environment, software vendor system 160 may send the private key, via the secured communication channel, to TEE 140 at host system 120 for signing the package. Software building component 170 may then cryptographically sign the software package using the private key of software vendor system 160. Software building component 170 may then discard the private key received from software vendor system 160 after signing the software package with the private key.

Encrypted memory regions 145 may be regions of memory that are assigned to a set of one or more processes and that store data in an encrypted form. The data may be encrypted and decrypted by hardware devices using cryptographic keys that are accessible to the hardware devices and may be inaccessible to processes executed by the hardware devices, this may be the same or similar to hardware based encryption, hardware level encryption, other term, or a combination thereof. The hardware devices may include one or more general purpose processors (e.g., CPUs), graphical processing units (GPUs), secure elements (SE), secure cryptoprocessors, memory controller, other integrated circuit, or a combination thereof.

The encrypted memory region may be a contiguous or non-contiguous portion of physical memory, virtual memory, logical memory, or other abstraction and may a portion of primary memory (e.g., main memory), auxiliary memory (e.g., solid state storage), adapter memory, other persistent or non-persistent storage, or a combination thereof. In one example, the encrypted memory region may be a portion of main memory associated with a particular process and the processor may encrypt the data when storing the data in the memory region and may decrypt the data when accessing the data in the memory region. The data in the memory region may be transformed (e.g., encrypted or decrypted) before, during, or after it is stored in or accessed from the memory region. The data may remain in an encrypted form while in the encrypted memory region and may or may not remain in an encrypted form when stored within the processor.

The shared storage service 150 may be implemented by one or more storage nodes, one or more container servers to manage mappings of object containers, one or more object servers to manage objects (such as files) on the storage nodes, and one or more authentication servers to manage accounts defined within the object storage service. In some implementations, the shared storage service may further implement one or more software repositories for storing virtual machine images, operating system code and metadata, application code and metadata, workload images, software update code and metadata, or a combination thereof.

Computing environment 100 may include one or more networks. The one or more networks may include a public network (e.g., the internet), a private network (e.g., a local area network (LAN) or wide area network (WAN)), or a combination thereof. In one example, the network may include a wired or a wireless infrastructure, which may be provided by one or more wireless communications systems, such as a wireless fidelity (WiFi) hotspot connected with the network and/or a wireless carrier system that may be implemented using various data processing equipment, communication towers, etc.

Figure 2:
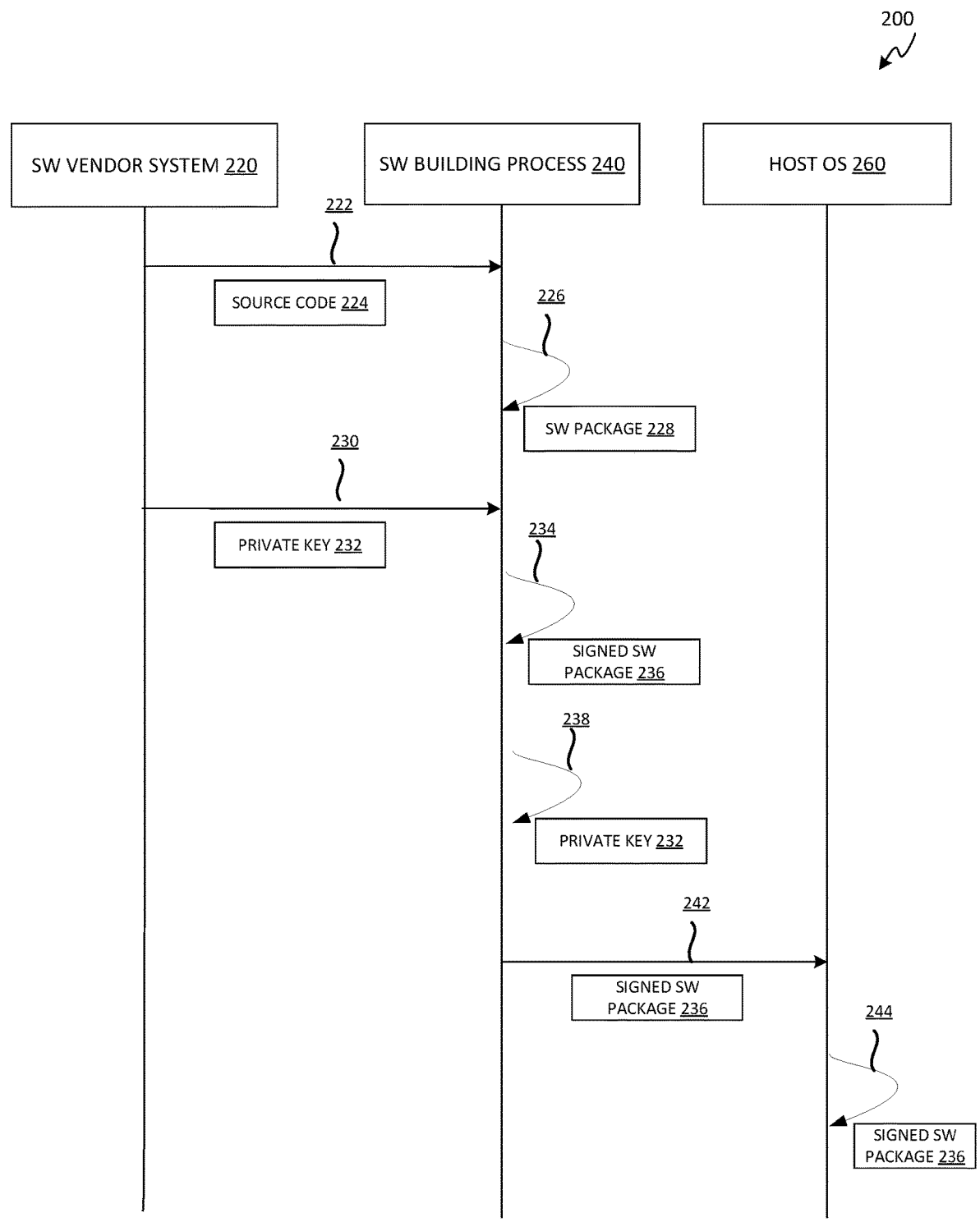
FIG. 2 is a sequence diagram illustrating the process of building a software package at a TEE and cryptographically signing the built package by a private key of the software vendor system, in accordance with one or more aspects of the present disclosure.

FIG. 2 is a sequence diagram illustrating the process of building a software package at a TEE and cryptographically signing the built package by a private key of the software vendor system, in accordance with one or more aspects of the present disclosure. Method 200 may be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations may be performed by one or more processors of a computer system (e.g., the computer system 500 of FIG. 5 or apparatus 700 of FIG. 7) implementing the method. In an illustrative example, method 200 may be performed by a single processing thread. Alternatively, method 200 may be performed by two or more processing threads, each thread implementing one or more individual functions, routines, subroutines, or operations of the method. In an illustrative example, the processing threads implementing method 200 may be synchronized (e.g., using semaphores, critical sections, or other thread synchronization mechanisms).

Method 200 starts at operation 222. At operation 222, SW building process 240 receives software source code 224 from software vendor system 220. In an implementation, software building process 240 may be the same or similar to software building component 170 of FIG. 1, host OS 260 may be the same or similar to OS 132 of FIG. 1, and SW vendor system 220 may be the same or similar to software vendor system 160 of FIG. 1. In an implementation, building process 240 may be executing within a trusted execution environment (TEE) that is the same or similar to TEE 140 of FIG. 1. SW building process 240 may receive source code 224 to be able to build the source code based on environment and preference configurations of the host system of software building process 240.

At operation 226, SW building process 240 may gather relevant environment parameters and build preferences of the host computer system hosting building process 240, such that software package 228 may be customized during the build process to match the environment and preference configurations of the host system. As an example, relevant environment parameters and preferences may include the type of operating system of the host system, type of networking protocol, whether or not to disable announcements or access to the network, whether or not to include a date of the build, and/or whether or not to add a logo of the company in the package. SW building process 240 may then build software package 228 based on source code 224 and the collected environment parameters.

At operation 230, SW building process 240 may receive private key 232 from SW vendor system 220 in order to sign software package 228 using private key 232 of the software vendor, thus validating the authenticity of SW package 228, for example at installation time of the package, as explained in more details below. In an implementation, when a secured communication channel is opened to send private key 232 from SW vendor 220 to building process 240. In an implementation. software vendor 220 performs a remote attestation of building process 240 confirming that the build environment of the building process 240 is legitimate and protected (e.g., by receiving from the build environment on the host a value representing its identity and configuration of the host system 120 and validating the received value via a common root of trust), before sending private key 232 via the secured communication channel. At operation 234, SW building process 240 may sign SW package 228 using private key 232 to generate signed SW package 236.

At operation 238, after signing SW package 228 using private key 232, software building process 240 may discard private key 232 from the host system to further ensure the integrity of the private key and to eliminate the possibility of other processes accidently accessing private key 232 in memory of SW building process 240.

At operation 242, software build process 240 may deploy signed software package 236 and a cryptographic signature of the package to host operating system (OS) 260 for validation and installation. In an implementation, the cryptographic signature may be used to verify that the signed software package 236 is authentic as signed by private key 232 of software vendor system 229. After validating that the signed software package is signed by the SW vendor, the signed software package 236 may be deemed valid and may be installed at the host computer system. On the other hand, if the signature of the signed SW package cannot be validated, an installation of signed software package 236 may be aborted.

At operation 244, host OS 260, after validating signed software package 236, may install signed software package 236. In implementations, the installed software may be made accessible to other physical or virtual systems within the same trust domain, as explained in more details herein.

Figure 3:
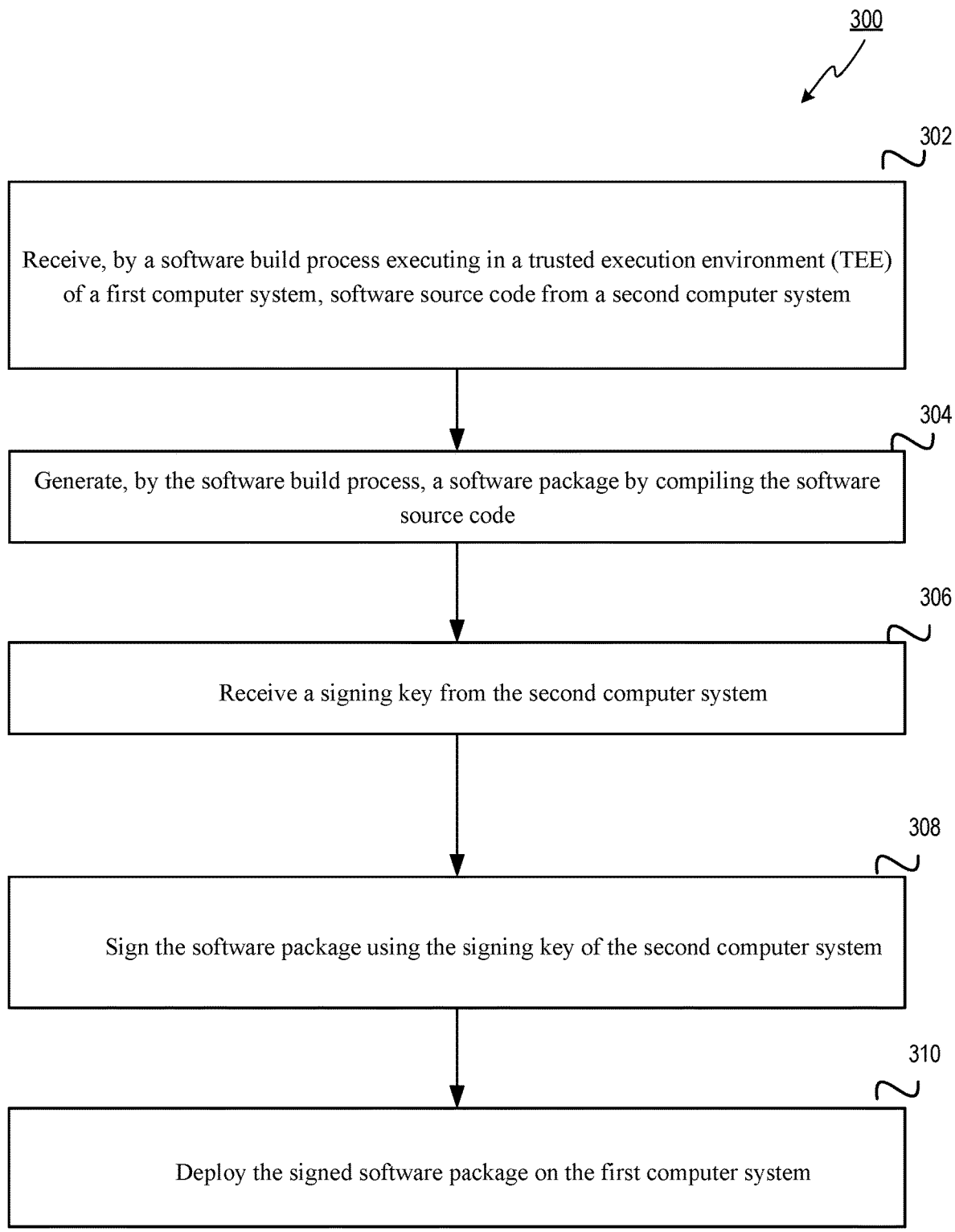
FIG. 3 is a flow diagram of an example method of management of building and signing of software package using a trusted execution environment (TEE), in accordance with one or more aspects of the present disclosure.

FIG. 3 is a flow diagram of an example method of management of building and signing of software package using a trusted execution environment (TEE), in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., the computer system 500 of FIG. 5 or apparatus 700 of FIG. 7) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms). Alternatively, the processing threads implementing method 300 may be executed asynchronously with respect to each other. Therefore, while FIG. 3 and the associated description lists the operations of method 300 in certain order, various implementations of the method may perform at least some of the described operations in parallel or in arbitrary selected orders.

Referring to FIG. 3, at operation 302, the processing logic, executing within a software build process in a trusted execution environment (TEE) of a host computer system, receives software source code from a software vendor computer system. In implementations, the software vendor system may represent an entity with ownership or licensing rights of certain software source code. The software vendor system may also have the capability to sign software packages that are generated by compiling the source code, as explained in more details herein.

At operation 304, the processing logic generates a software package by compiling the software source code. In one implementation, the generated software package may be customized to match environment and preference configurations of the host computer system.

At operation 306, the processing logic receive a private key from the software vendor system to cryptographically sign the compiled software package using the private key of the software vendor system. In an implementation, the private key from the vendor may be a specific key dedicated to the client building the software package at the host, as explained in more details herein above.

At operation 308, the processing logic signs the build software package using the private key received from the software vendor system. At operation 310, the processing logic deploys the software package on the host computer system. In an implementation, the processing logic may validate the signed software package using a cryptographic signature of the package and then may install the software package on the host computer system.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. Each method described herein and/or each of its individual functions, routines, subroutines, or operations may be performed by one or more processing devices of the computer system (e.g., computing environment 100 of FIG. 1) implementing the method. In certain implementations, the method may be performed by a single processing thread. Alternatively, the method may be performed by two or more processing threads, each thread executing one or more individual functions, routines, subroutines, or operations of the method. In an illustrative example, the processing threads implementing the method may be synchronized (e.g., using semaphores, critical sections, and/or other thread synchronization mechanisms). Alternatively, the processing threads implementing the method may be executed asynchronously with respect to each other.

Figure 4:
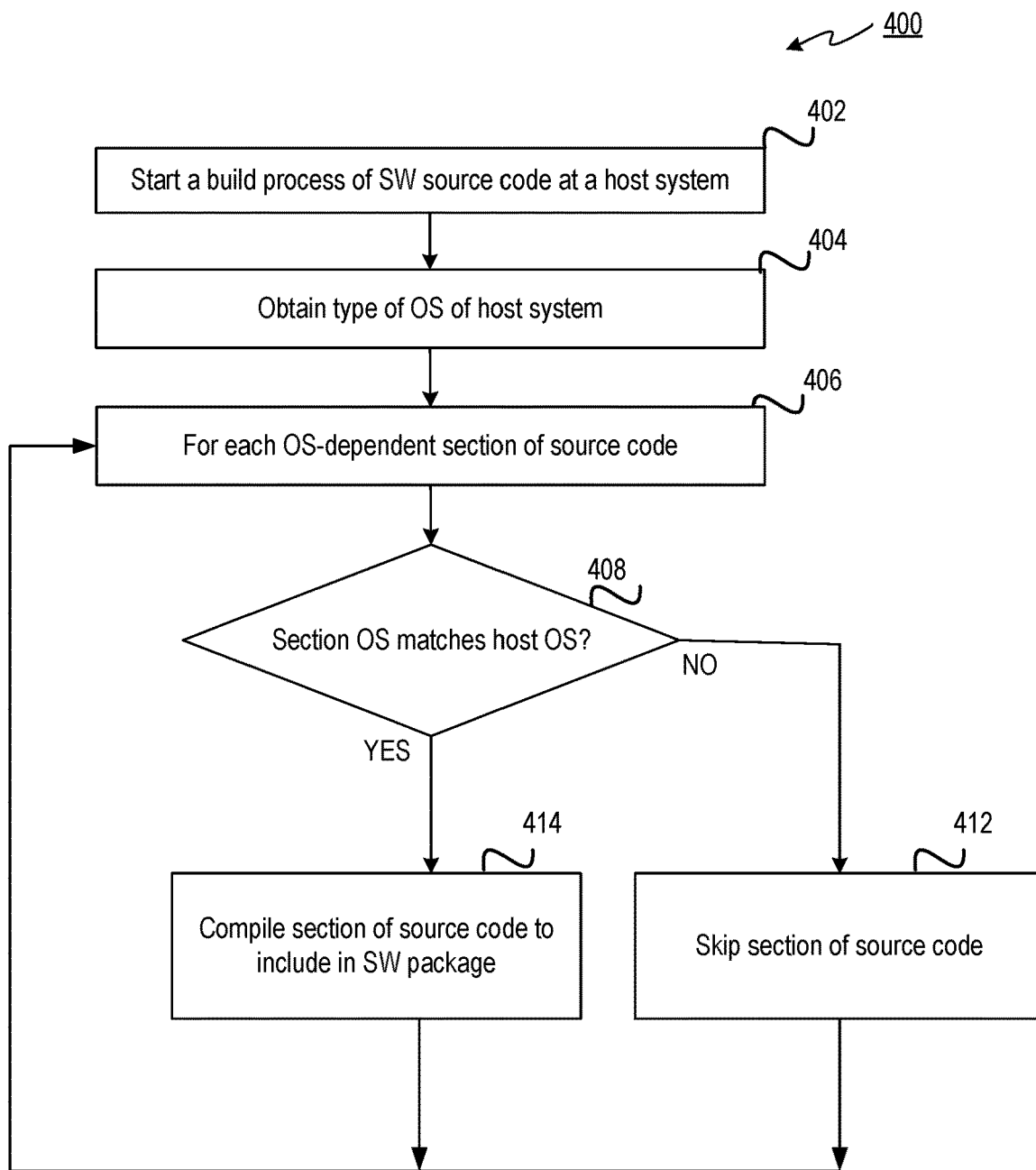
FIG. 4 illustrates an example method for customizing a build of a software package based on configuration of a host system, in accordance with one or more aspects of the present disclosure.

FIG. 4 illustrates an example method for customizing a build of a software package based on configuration of a host system, in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., the computer system 500 of FIG. 5 or apparatus 700 of FIG. 7) implementing the method. In an illustrative example, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

Method 400 starts at block 402. At block 402 of method 400, the processing logic starts a build process of software source code within a trusted execution environment (TEE) of a host system. In an implementation, the source code may be downloaded from a third party software vendor to be built in a secured environment within the host system based on the specific configuration user preference settings of the host system. The build process may include compiling the source code and generating a software package as an output of the build process.

At operation 404, the processing logic obtains a type of the operating system (OS) of the host computer system. in an implementation, the type of operating system may be obtained from an environment parameter of the host computer system. In certain implementations, some sections of the source code may be marked at OS-dependent and may selectively be included or excluded when compiling the source code to generate a binary package that can be installed and executed. As an example, OS-dependent sections that do not match a target execution environment may be excluded from compilation of the package, thus resulting in a smaller package and a more efficient execution path of the generated software package.

At operation 406, the processing logic iterates through each OS-dependent section of the source code to determine whether or not to include the OS-dependent section in the software binary package. At operation 408, the processing logic determines whether the OS referenced by the OS-dependent section matches the OS of the host system. In implementations, a first OS reference may be determined to match a second OS reference if both OSs have the same version and the same OS type. In other implementations, the matching algorithm may allow variations of OS versions when determining a match, such that a first OS reference of a certain type and a first version may be determined to match a second OS reference of the same type that has a different version of the OS.

At operation 412, when the processing logic determines that the OS referenced by the OS-dependent section does not match the OS of the host system, the processing logic exclude the OS-dependent section from the generated SW package by skipping the OS-dependent section from the compilation process of the source code. The processing logic may then proceed to process the next OS-dependent section of the source code.

On the other hand, at operation 414, when the processing logic determines that the OS referenced by the OS-dependent section matches the OS of the host system, the processing logic compiles the OS-dependent section to include the OS-dependent section in the generated SW package. The processing logic may then proceed to process the next OS-dependent section of the source code.

Figure 5:
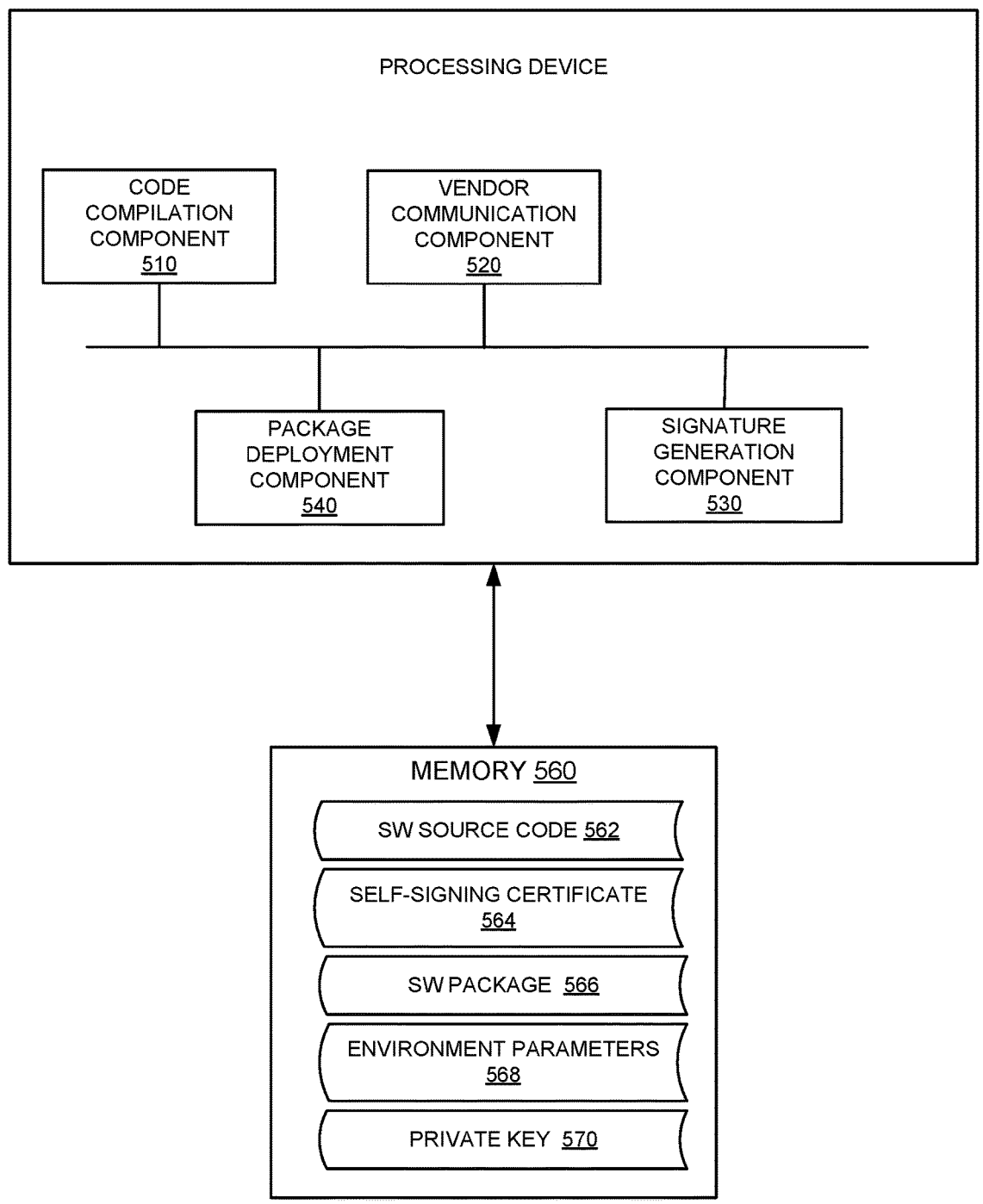
FIG. 5 depicts a block diagram of an example computer system in accordance with one or more aspects of the present disclosure.

FIG. 5 depicts a block diagram of an example computer system 500 in accordance with one or more aspects of the present disclosure. Computer system 500 may include one or more processing devices and one or more memory devices. In the example shown, computer system 500 may include a code compilation component 510, vendor communication component 520, signature generation component 530, and package deployment component 540. Components of computer system 500 may access memory 560 to implement methods in accordance to aspects of the disclosure.

Code compilation component 510 may enable a processing device of computer system 500 to perform software compilation of source code 562 to build a software package 566 within a trusted execution environment (TEE) of a host computer system. In an implementation, code compilation component 510 may compile sections of source code 562 that matches environment parameters 568 of the host system. In an implementation, code compilation component 510 may obtain relevant environment parameters and build preferences 568 of the host computer system may use parameters 568 for customizing software package 566 for the needs and configurations of the host system during compilation of the SW package 566. In an illustrative example, sections of source code 562 that do not match the environment and preference parameters 568 of the host may be excluded from software package 566 by excluding said sections from the compilation process.

Vendor communication component 520 may be responsible for communication between the host system and a software vendor system that is responsible for providing the source code to be built within a TEE at the host system. In one implementation, vendor communication component 520 may be responsible for downloading source code 562 from the vendor system to the host to be compiled by code compilation component 520. In an implementation, vendor communication component 520 may also be responsible for opening a secured communication channel between the host system and the vendor system (e.g., a VPN channel, an SSH channel, etc.) to send a hash of a generated SW package that is built on the host system to the vendor system to be signed by the vendor system. Vendor communication component 520 may also be responsible for confirming an attestation of the vendor system approving communication with the host via the secured communication channel before sending the hash to the vendor for signing. Vendor communication component 520 may also be responsible for sending the signed hash back to the host system via the secured communication channel. In one implementation, vendor communication component 520 may send private key 570 to code compilation component 520 for signing the generated software package locally at the computer system hosting code compilation component 520 using private key 570 of the vendor system.

Signature generation component 530 may be responsible for generating a hash of the compiled SW package 566 to be signed by the vendor system. The hash for compiled software package 566 may be generated using a secure cryptographic hash function, such as HMAC functions, SHA 2, SHA 3, or another cryptographic hash function. In implementations, signature generation component 530 may also be used to generate a second hash of SW package 566 to compare with the originally generated hash in order to validate the integrity of SW package 566. As an example, before installing package 566 at the host system, signature generation component 539 may create a new hash of SW package 566 deployed at the host. The new hash may be compared with the signed hash of package 566. If the newly generated hash of package 566 matches the signed hash, software package 566 may be deemed valid and may be installed at the host computer system. on the other hand, if the newly generated hash does not match the signed hash, an installation of software package 566 may be aborted. In some implementations, signature generation component 530 may self-sign a generated hash using self-sign certificate 562 before sending the hash to the vendor system for signing using a private key of the vendor system, as explained in more details herein above.

Package deployment component 540 may be responsible for deploying package 566 to an operating system (OS) of the host computer system after receiving a signed hash of package 566 from the vendor system. In an implementation, after deploying package 566 to the OS, package deployment component 540 may validate SW package 566 using the signed hash as explained above with respect to signature generation component 530. After validating that package 566 is integrity-protected, package deployment component 540 may install software package 566 and may enable the installed software to be used by other physical or virtual systems within the same trust domain as the host system.

Figure 6:
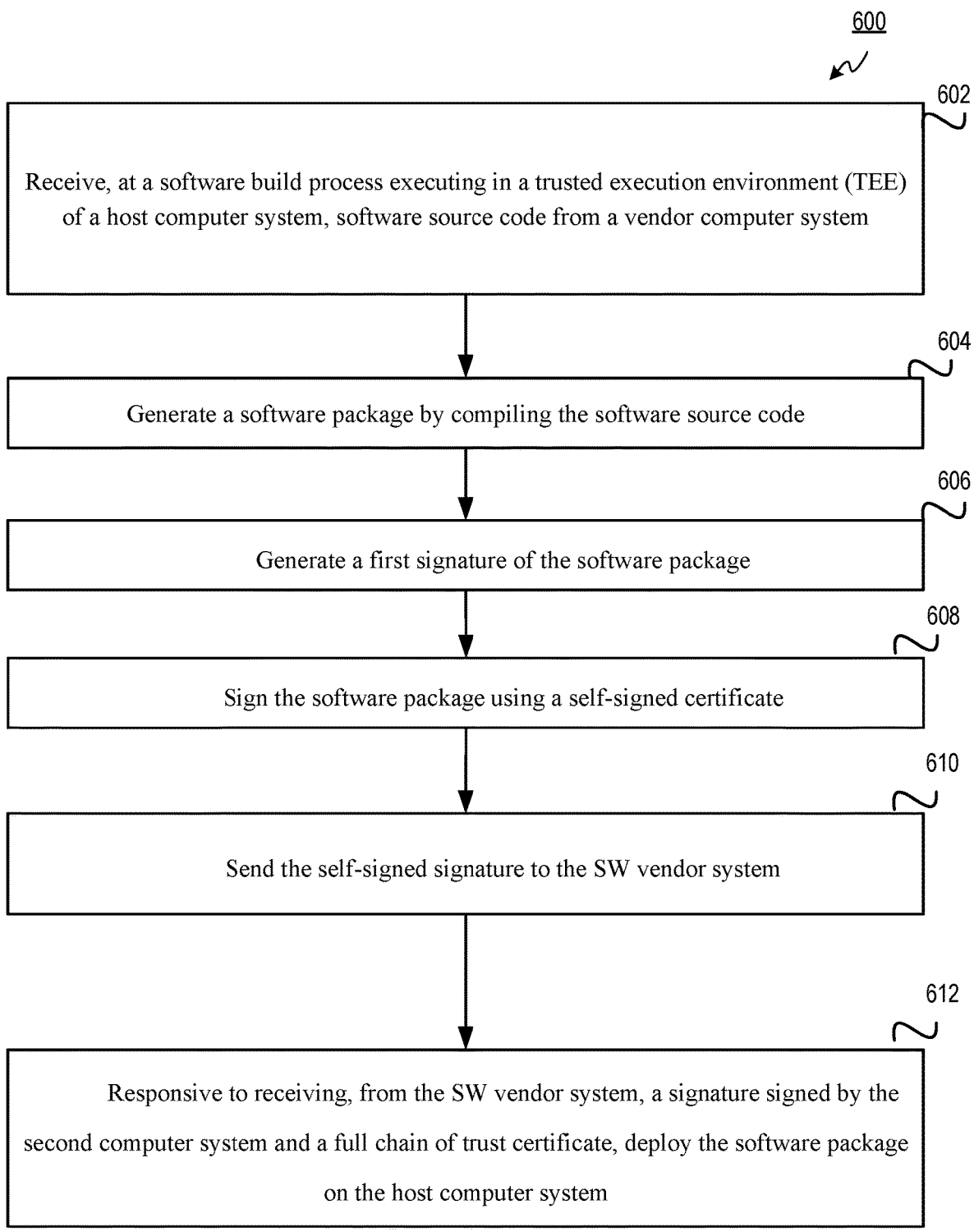
FIG. 6 is a flow diagram of an example method of management of building, self-signing, and signing of software package using a trusted execution environment (TEE), in accordance with one or more aspects of the present disclosure.

FIG. 6 is a flow diagram of an example method of management of building, self-signing, and signing of software package using a trusted execution environment (TEE), in accordance with one or more aspects of the present disclosure. Method 600 may be performed by processing logic that includes hardware (e.g., circuitry, dedicated logic, programmable logic, microcode, etc.), software (e.g., instructions run on a processor to perform hardware simulation), or a combination thereof. Method 600 or each of its individual functions, routines, subroutines, or operations may be performed by one or more processors of a computer system (e.g., the computer system 500 of FIG. 5 or apparatus 700 of FIG. 7) implementing the method. In an illustrative example, method 600 may be performed by a single processing thread. Alternatively, method 600 may be performed by two or more processing threads, each thread implementing one or more individual functions, routines, subroutines, or operations of the method. In an illustrative example, the processing threads implementing method 600 may be synchronized (e.g., using semaphores, critical sections, or other thread synchronization mechanisms). Alternatively, the processing threads implementing method 600 may be executed asynchronously with respect to each other. Therefore, while FIG. 6 and the associated description lists the operations of method 600 in certain order, various implementations of the method may perform at least some of the described operations in parallel or in arbitrary selected orders.

At operation 602, the processing logic, executing within a software build process in a trusted execution environment (TEE) of a host computer system, receives software source code from a software vendor computer system for building a software package that is customized to the configuration and preferences of the host computer system, as explained in more details herein.

At operation 604, the processing logic generates a software package by compiling the software source code. In one implementation, the generated software package may be customized to match environment and preference configurations of the host computer system, as explained in more details herein.

At operation 606, the processing logic generates a signature of the compiled software package (e.g., a hash of the software package), and at operation 608 the processing logic self-signs the signature of the software package. In an implementation, self-signing the signature of the compiled package may be performed to provide proof from the host system that the signature of the generated package is legitimate. The processing logic may then proceed to send the self-signed signature to the vendor system for signing with a private key.

At operation 610, the processing logic sends the self-signed signature of the package to the software vendor system. In one implementation, the self-signed signature of the package may be sent to the software vendor system via a secured communication channel after receiving a remote attestation from the vendor system confirming the integrity of the building environment where the software package is built, as explained in more details herein.

At operation 612, that software vendor system may sign the self-signed signature using a private key of the vendor and may send the signed signature back to the host system, along with a full chain of trust certificate of the signed package. Responsive to receiving, from the vendor computer system, the signed signature of the package, the processing logic deploys the software package on the host computer system. In an implementation, the processing logic may validate the software package using the signed hash and the full chain of trust certificate, and may then install the software package on the host computer system.

Figure 7:
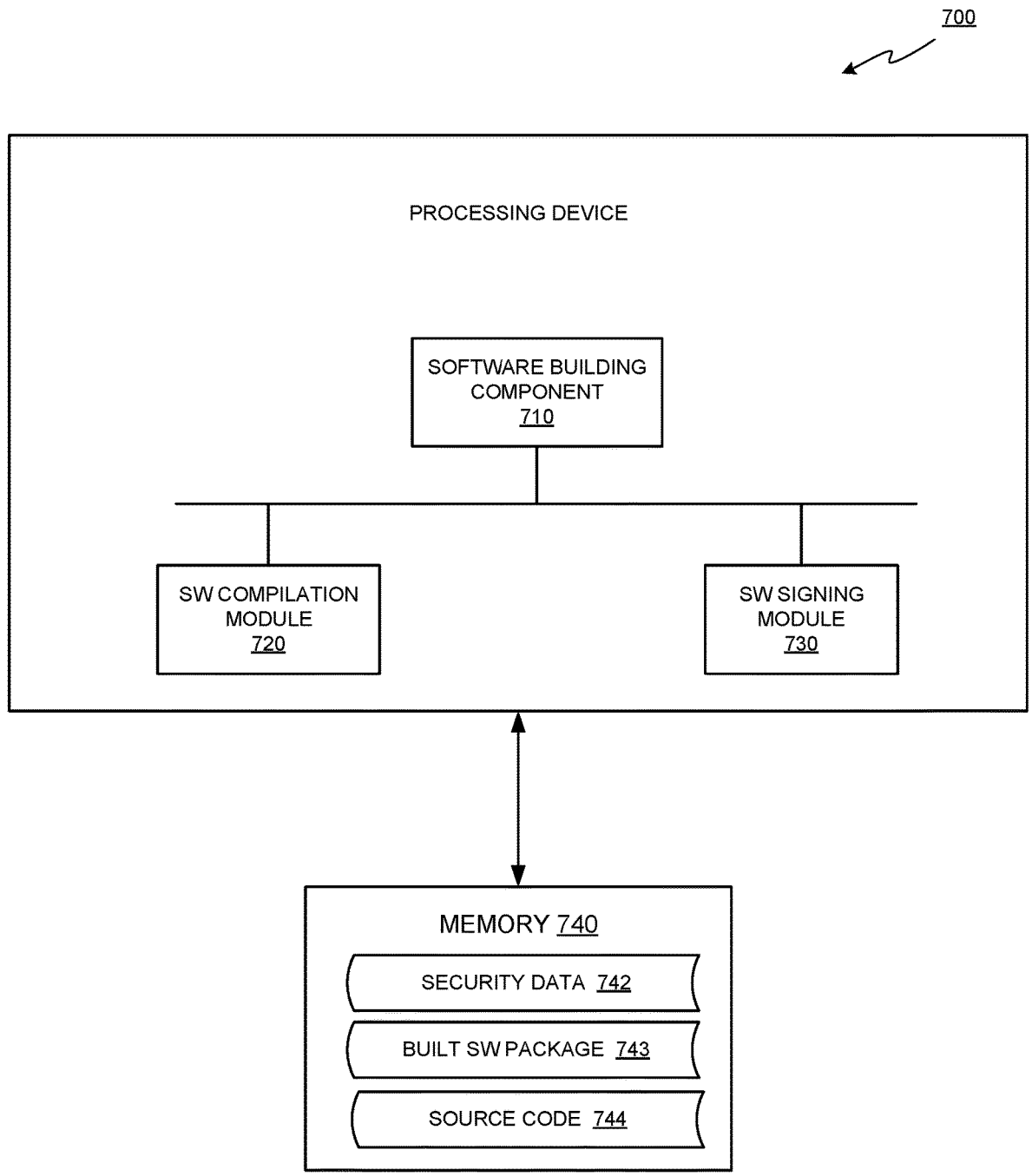
FIG. 7 depicts a block diagram of an illustrative apparatus operating in accordance with one or more aspects of the disclosure.

FIG. 7 depicts a block diagram of an illustrative apparatus 700 operating in accordance with one or more aspects of the disclosure. In various illustrative examples, apparatus 700 may be represented by computing environment 100 of FIG. 1. Apparatus 700 comprises a memory 740 and processing device operatively coupled to the memory 740 and executes code implementing software building component 710, SW compilation module 720, and SW signing module 730. Memory 740 may store security data 742 representing private keys that may be used by signing module 730 for signing built SW package 743, such that each private key is associated with a client of the computing environment. Software building component 710 may provide source code 744 to SW compilation module 720 to be compiled within a trusted execution environment and customized to accommodate settings of the computing environment of apparatus 700, as explained in more details herein. The processing device of apparatus 700 may include a software building component 710 operating in accordance with one or more aspects of the present disclosure. In an illustrative example, software building component 710 may implement methods 200, 300, 400 and/or 600 of FIGS. 2, 3, 4, and 6.

Figure 8:
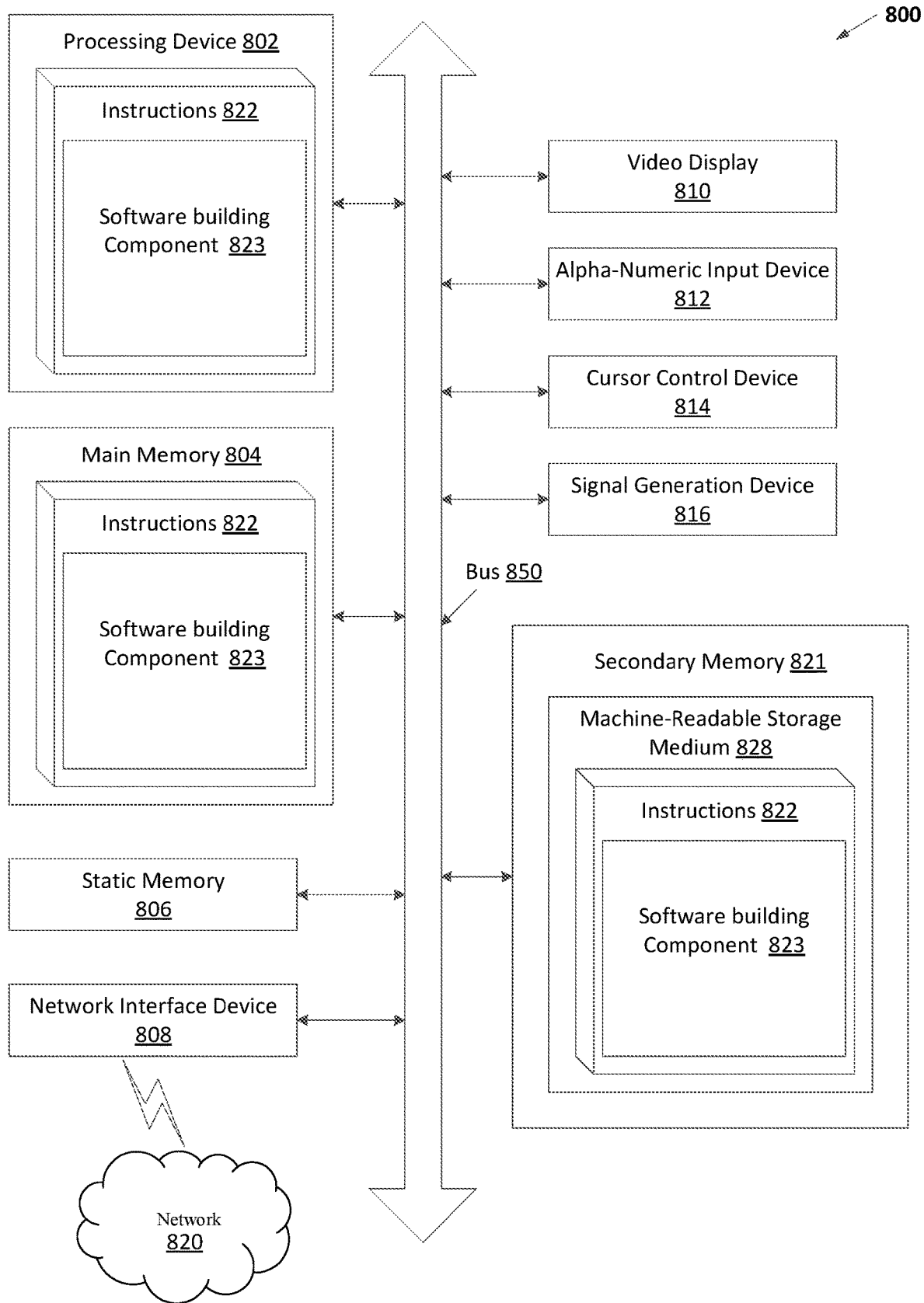
FIG. 8 illustrates a diagrammatic representation of a machine in the exemplary form of a computer system, in accordance with one or more aspects of the present disclosure.

FIG. 8 illustrates a diagrammatic representation of a machine in the exemplary form of a computer system 800 within which a set of instructions, for causing the machine to perform any one or more of the methodologies discussed herein, may be executed. The computer system 800 may correspond to computer system 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 816 (e.g., a data storage device), which communicate with each other via a bus 850.

The processing device 802 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 802 may therefore include multiple processors. The processing device 802 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 802 may also be one or more special-purpose processing devices such as an application specific integrated circuit (ASIC), a field programmable gate array (FPGA), a digital signal processor (DSP), network processor, or the like.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The secondary memory 821 may include a machine-readable storage medium (or more specifically a computer-readable storage medium) 828 on which is stored one or more sets of instructions 822 embodying any one or more of the methodologies or functions described herein (e.g., software building component 823). The instructions 822 may also reside, completely or at least partially, within the main memory 804 and/or within the processing device 802 during execution thereof by the computer system 800; the main memory 804 and the processing device 802 also constituting machine-readable storage media.

While computer-readable storage medium 828 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "reading," "setting," "detecting," "obtaining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300-400 of FIGS. 3-4 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein.

What is claimed is:

1. A method comprising:
 receiving, by a software build process executing in a trusted execution environment (TEE) of a first computer system, software source code from a second computer system;
 generating, by the software build process, a software package by:
  obtaining environment parameters of the first computer system, wherein the environment parameters of the first computer system indicate operating system and network configurations of the first computer system; and building the software package from the software source code in view of the environment parameters of the first computer system to tailor the software package to the first computer system;

receiving, from the second computer system, a signing key associated with the second computer system;

signing the software package using the signing key associated with the second computer system; and deploying the signed software package on the first computer system.

2. The method of claim 1, wherein the second computer system is associated with a software vendor of the software source code.

3. The method of claim 1 further comprises:
responsive to signing the software package with the signing key, discarding the signing key from a memory of the first computer system.

4. The method of claim 1, wherein building the software package comprises removing parts of the software source code that do not match the environment parameters of the first computer system.

5. The method of claim 1, wherein the signing key is a private key of a plurality of private keys of the second computer system, and wherein each of the plurality of private keys is associated with a client of the second computer system.

6. The method of claim 1, wherein the signing key is a private key of a plurality of private keys of the second computer system, and wherein each of the plurality of private keys is associated with a separate version of the software source code.

7. The method of claim 1, wherein receiving the signing key from the second computer system is performed via a secured communication channel between the first computer system and the second computer system.

8. The method of claim 1, wherein receiving the signing key from the second computer system is performed responsive to sending, by the first computer system, a request for the signing key to the second computer system.

9. The method of claim 1 further comprising:
providing the signed software package and a cryptographic signature associated with the signed software package to an operating system of the first computer system; and installing the signed software package on the first computer system responsive to validating the signed software package using the cryptographic signature.

10. The method of claim 9 further comprising:
responsive to installing the signed software package, causing the installed software package to be accessible by other computer systems in a same trust domain as the first computer system.

11. A system comprising:
a memory; and
a processing device operatively coupled to the memory, wherein the processing device is further to:
receive, by a software build process executing in a trusted execution environment (TEE) of a first computer system, software source code from a second computer system;

generate, by the software build process, a software package by:
obtaining environment parameters of the first computer system, wherein the environment parameters of the first computer system indicate operating system and network configurations of the first computer system; and building the software package from the software source code in view of the environment parameters of the first computer system to tailor the software package to the first computer system;

receive, from the second computer system, a signing key associated with the second computer system;

sign the software package using the signing key associated with the second computer system; and deploy the signed software package on the first computer system.

12. The system of claim 11, wherein the processing device is further to:
responsive to signing the software package with the signing key, discard the signing key from a memory of the first computer system.

13. The system of claim 11, wherein the processing device is further to:
provide the signed software package and a cryptographic signature associated with the signed software package to an operating system of the first computer system; and install the signed software package on the first computer system responsive to validating the signed software package using the cryptographic signature.

14. The system of claim 11, wherein receiving the signing key from the second computer system is performed via a secured communication channel between the first computer system and the second computer system.

15. A non-transitory computer-readable storage medium comprising executable instructions that, when executed by a processing device, cause the processing device to:
receive, by a software build process executing in a trusted execution environment (TEE) of a first computer system, software source code from a second computer system;

generate, by the software build process, a software package by:
obtaining environment parameters of the first computer system, wherein the environment parameters of the first computer system indicate operating system and network configurations of the first computer system; and building the software package from the software source code in view of the environment parameters of the first computer system to tailor the software package to the first computer system;

receive, from the second computer system, a signing key associated with the second computer system;

sign the software package using the signing key associated with the second computer system; and deploy the signed software package on the first computer system.

16. The non-transitory computer-readable storage medium of claim 15, wherein the second computer system is associated with a software vendor of the software source code.

17. The non-transitory computer-readable storage medium of claim 15, wherein the signing key is a private key of a plurality of private keys of the second computer system, and wherein each of the plurality of private keys is associated with a client of the second computer system.

18. The non-transitory computer-readable storage medium of claim 15, wherein to build the software package based on the environment parameters of the first computer system, the processing device is further to remove parts of the software source code that do not match the environment parameters of the first computer system.

\* \* \* \* \*